(12) United States Patent
Asano et al.

(10) Patent No.: US 12,548,793 B2
(45) Date of Patent: *Feb. 10, 2026

(54) METHOD OF PRODUCING LITHIUM ION SECONDARY BATTERY AND NEGATIVE ELECTRODE MATERIAL

(71) Applicant: TOYOTA JIDOSHA KABUSHIKI KAISHA, Toyota (JP)

(72) Inventors: Hiroto Asano, Nisshin (JP); Shinsuke Matsuhara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 442 days.

This patent is subject to a terminal disclaimer.

(21) Appl. No.: 18/210,123

(22) Filed: Jun. 15, 2023

(65) Prior Publication Data

US 2023/0327180 A1  Oct. 12, 2023

Related U.S. Application Data

(63) Continuation of application No. 17/107,116, filed on Nov. 30, 2020, now Pat. No. 11,721,833.

(30) Foreign Application Priority Data

Feb. 17, 2020 (JP) .................................. 2020-024584

(51) Int. Cl.
*H01M 10/0525* (2010.01)
*H01M 4/02* (2006.01)
(Continued)

(52) U.S. Cl.
CPC ..... *H01M 10/0525* (2013.01); *H01M 4/0402* (2013.01); *H01M 4/0471* (2013.01);
(Continued)

(58) Field of Classification Search
None
See application file for complete search history.

(56) References Cited

U.S. PATENT DOCUMENTS

2014/0113200 A1* 4/2014 Seymour ............. H01M 4/0416
361/502
2016/0028084 A1* 1/2016 Lee ....................... H01M 4/587
216/13
(Continued)

FOREIGN PATENT DOCUMENTS

CN      109768226 A    5/2019
JP      2001-126770 A  5/2001
(Continued)

OTHER PUBLICATIONS

Aug. 31, 2022 Office Action Issued in U.S. Appl. No. 17/107,116.
(Continued)

*Primary Examiner* — Scott J. Chmielecki
(74) *Attorney, Agent, or Firm* — Oliff PLC (57) ABSTRACT

A method of producing a lithium ion secondary battery includes preparing an electrode body which includes a positive electrode and a negative electrode and in which the negative electrode contains a negative electrode material containing a porous graphite particle having open pores and $SiO_2$ disposed in the open pores, producing a battery assembly including the electrode body and a non-aqueous electrolytic solution containing $LiPF_6$ with a concentration of 1 mol/L or more, and generating lithium difluorophosphate in the electrode body.

13 Claims, 2 Drawing Sheets

(51) Int. Cl.
    *H01M 4/04*         (2006.01)
    *H01M 4/583*      (2010.01)
    *H01M 10/0568*   (2010.01)

(52) U.S. Cl.
    CPC ....... *H01M 4/583* (2013.01); *H01M 10/0568* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2017/0149055 A1 | 5/2017 | Takahashi et al. |
| 2018/0013143 A1* | 1/2018 | Asakawa .............. C01G 33/006 |
| 2019/0140308 A1* | 5/2019 | Ohsawa ................ H01M 4/386 |
| 2019/0181455 A1 | 6/2019 | Ishii et al. |

FOREIGN PATENT DOCUMENTS

| | | |
|---|---|---|
| JP | 2005-123175 A | 5/2005 |
| JP | 2005-219994 A | 8/2005 |
| JP | 2013-110104 A | 6/2013 |
| JP | 2015-079621 A | 4/2015 |
| JP | 2015-153484 A | 8/2015 |
| JP | 2017-103202 A | 6/2017 |
| JP | 2017-220332 A | 12/2017 |
| JP | 2019-106367 A | 6/2019 |

OTHER PUBLICATIONS

Dec. 23, 2022 Office Action Issued in U.S. Appl. No. 17/107,116.
Apr. 5, 2023 Notice of Allowance Issued in U.S. Appl. No. 17/107,116.

* cited by examiner

FIG. 2

METHOD OF PRODUCING LITHIUM ION SECONDARY BATTERY AND NEGATIVE ELECTRODE MATERIAL

CROSS-REFERENCE TO RELATED APPLICATION

This application is a continuation of U.S. application Ser. No. 17/107,116 filed Nov. 30, 2020, and further claims priority to Japanese Patent Application No. 2020-024584 filed on Feb. 17, 2020, incorporated herein by reference in its entirety.

BACKGROUND

1. Technical Field

The present disclosure relates to a method of producing a lithium ion secondary battery. The present disclosure also relates to a negative electrode material of a lithium ion secondary battery.

2. Description of Related Art

In recent years, lithium ion secondary batteries have been suitably used for portable power supplies of computers, mobile terminals, and the like and power supplies for driving vehicles such as electric vehicles (EV), hybrid vehicles (HV), and plug-in hybrid vehicles (PHV).

With the spread of lithium ion secondary batteries, higher performance is desired. Regarding one technology for improving performance of lithium ion secondary batteries, a technology in which, in order to improve cycle characteristics and storage characteristics, lithium difluorophosphate ($LiPO_2F_2$) is added to a non-aqueous electrolytic solution, and a coating derived from lithium difluorophosphate is formed on an electrode is known (for example, refer to Japanese Unexamined Patent Application Publication No. 2005-219994 (JP 2005-219994 A)). It is disclosed in JP 2005-219994 A that, when lithium hexafluorophosphate ($LiPF_6$), which is widely used as a supporting salt (electrolyte salt) in a non-aqueous electrolytic solution, is reacted with silicon dioxide ($SiO_2$) in a non-aqueous solvent, a non-aqueous electrolytic solution containing lithium difluorophosphate can be easily produced.

SUMMARY

However, according to studies by the inventors, it has been found that, when a non-aqueous electrolytic solution contains lithium difluorophosphate, lowering of the resistance of a lithium ion secondary battery is insufficient. Specifically, lithium difluorophosphate is a component that can contribute to lowering the resistance of the lithium ion secondary battery. However, it is found that, when the non-aqueous electrolytic solution contains lithium difluorophosphate with a high concentration, the lithium ion conductivity of the non-aqueous electrolytic solution decreases, and as a result, the resistance actually becomes higher.

Therefore, the present disclosure provides a method by which it is possible to produce a lithium ion secondary battery having low resistance.

The method of producing a lithium ion secondary battery disclosed here includes a process of preparing an electrode body which includes a positive electrode and a negative electrode and in which the negative electrode contains a negative electrode material containing graphite having open pores and $SiO_2$ disposed in the open pores; a process of producing a battery assembly including the electrode body and a non-aqueous electrolytic solution containing $LiPF_6$ with a concentration of 1 mol/L or more; a process of initially charging the battery assembly; and a process of performing an aging treatment on the initially charged battery assembly in an environment of a temperature of 50° C. or higher.

In such a configuration, it is possible to produce a lithium ion secondary battery having low resistance.

In a preferable aspect of the method of producing a lithium ion secondary battery disclosed here, the porosity of the graphite is 5% or more and 25% or less.

In such a configuration, it is possible to further reduce the battery resistance while maintaining the strength of graphite.

In a preferable aspect of the method of producing a lithium ion secondary battery disclosed here, a mass ratio of $SiO_2$ to the graphite is 0.5 mass % or more and 10 mass % or less.

In such a configuration, it is possible to further reduce the battery resistance.

In another aspect, regarding a material that can be used in the production method, a negative electrode material of a lithium ion secondary battery including graphite having open pores and $SiO_2$ disposed in the open pores is disclosed.

In a preferable aspect of the negative electrode material disclosed here, the porosity of the graphite is 5% or more and 25% or less.

In a preferable aspect of the negative electrode material disclosed here, a mass ratio of $SiO_2$ to the graphite is 0.5 mass % or more and 10 mass % or less.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the drawings. Here, components other than those mentioned in this specification that are necessary for implementing the present disclosure can be recognized by those skilled in the art as design matters based on the related art in the field. The present disclosure can be implemented based on content disclosed in this specification and common general technical knowledge in the field. In addition, members and portions having the same functions are denoted by the same reference numerals in the following drawings, and redundant descriptions thereof will be omitted. In addition, the sizes (a length, a width, a thickness and the like) in the drawings do not reflect actual sizes.

Here, the term "secondary battery" in this specification refers to a power storage device that can be repeatedly charged and discharged, and includes a so-called storage battery and a storage element such as an electric double layer capacitor.

In addition, the term "lithium ion secondary battery" in this specification refers to a secondary battery in which lithium ions are used as charge carriers, and charging and discharging are realized by movement of charges according to lithium ions between positive and negative electrodes.

Hereinafter, although the present disclosure will be described below in detail using a method of producing a flat rectangular lithium ion secondary battery including a wound electrode body as an example, the present disclosure is not intended to be limited to those described in these embodiments.

The method of producing a lithium ion secondary battery according to the present embodiment includes the following processes (A) to (D).

Process (A) of preparing an electrode body which includes a positive electrode and a negative electrode and in which the negative electrode contains a negative electrode material containing graphite having open pores and $SiO_2$ disposed in the open pores;

Process (B) of producing a battery assembly including the electrode body and a non-aqueous electrolytic solution containing $LiPF_6$ with a concentration of 1 mol/L or more;

Process (C) of initially charging the battery assembly; and

Process (D) of performing an aging treatment on the initially charged battery assembly in an environment of a temperature of 50° C. or higher.

Figure 1:
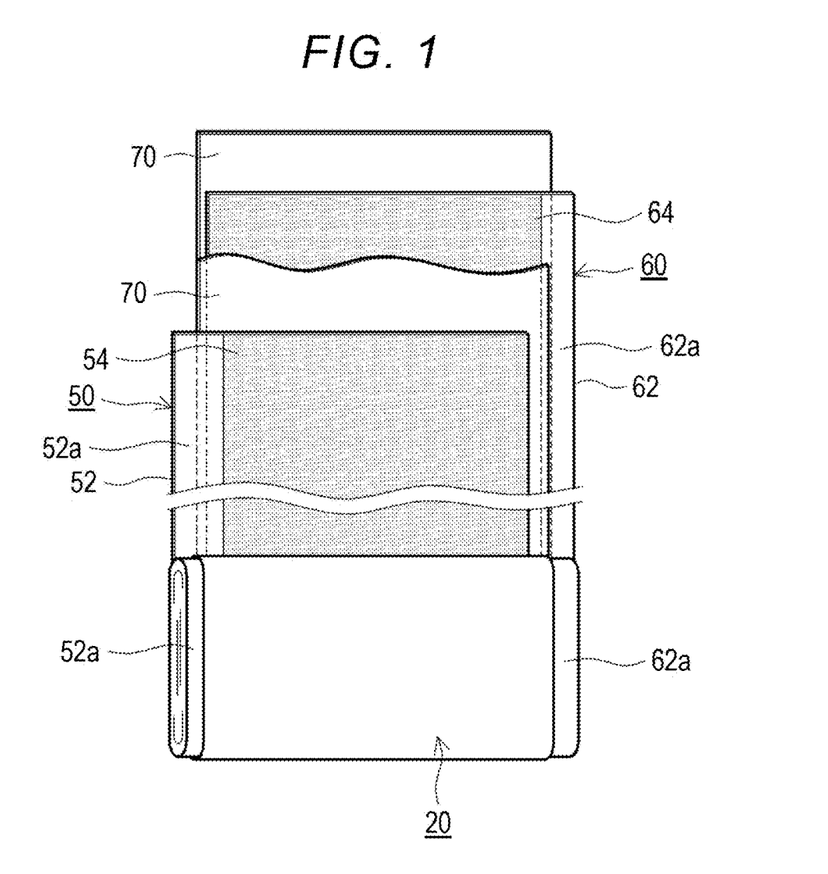
FIG. 1 is a schematic exploded view illustrating a configuration of an electrode body prepared according to one embodiment of the present disclosure.
Figure 2:
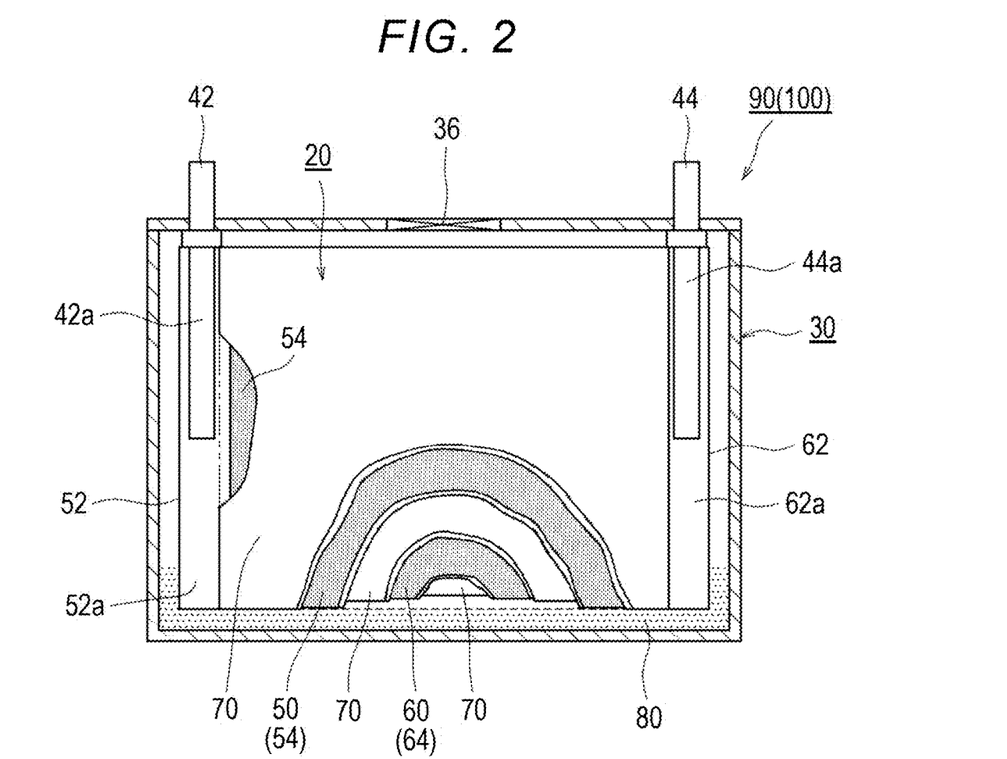
FIG. 2 is a cross-sectional view schematically showing a configuration of a battery assembly produced according to one embodiment of the present disclosure.

FIG. 1 is a schematic exploded view illustrating a configuration of an electrode body prepared according to the present embodiment. FIG. 2 is a cross-sectional view schematically showing a configuration of a battery assembly produced according to the present embodiment.

Process (A): Electrode Body Preparation Process

In the process (A), an electrode body 20 including a positive electrode 50 and a negative electrode 60 is prepared.

As shown in FIG. 1 and FIG. 2, the positive electrode 50 has typically a sheet form, and includes a positive electrode current collector 52, and a positive electrode active material layer 54 provided on one surface or both surfaces of the positive electrode current collector 52. In the shown example, the positive electrode 50 includes a positive electrode active material layer non-forming part 52a in which the positive electrode current collector 52 is exposed at an end thereof. The positive electrode active material layer non-forming part 52a functions as a current collecting part, but the configuration of the current collecting part is not limited thereto.

Regarding the positive electrode current collector 52, an aluminum foil or the like can be used.

The positive electrode active material layer 54 contains a positive electrode active material. Regarding the positive electrode active material, a known positive electrode active material used for a lithium secondary battery may be used. Examples of positive electrode active materials include lithium-containing transition metal oxides such as a lithium nickel composite oxide, a lithium cobalt composite oxide, a lithium manganese composite oxide, a lithium nickel manganese composite oxide (for example, $LiNi_{0.5}Mn_{1.5}O_4$), and a lithium nickel manganese cobalt composite oxide (for example, $LiNi_{1/3}Mn_{1/3}Co_{1/3}O_2$); and lithium transition metal phosphate compounds such as $LiFePO_4$. Among these, a lithium nickel manganese cobalt composite oxide is preferable.

The content of the positive electrode active material is not particularly limited, and is preferably 70 mass % or more and more preferably 80 mass % or more in the positive electrode active material layer 54 (that is, with respect to a total mass of the positive electrode active material layer 54).

The positive electrode active material layer 54 may contain components other than the positive electrode active material, for example, trilithium phosphate, a conductive material, and a binder. Regarding the conductive material, for example, carbon black such as acetylene black (AB) and other carbon materials (for example, graphite) can be suitably used. Regarding the binder, for example, polyvinylidene fluoride (PVdF) can be used.

The content of trilithium phosphate in the positive electrode active material layer 54 is not particularly limited, and is preferably 1 mass % or more and 15 mass % or less and more preferably 2 mass % or more and 12 mass % or less.

The content of the conductive material in the positive electrode active material layer 54 is not particularly limited, and is preferably 1 mass % or more and 15 mass % or less and more preferably 3 mass % or more and 13 mass % or less.

The content of the binder in the positive electrode active material layer 54 is not particularly limited, and is preferably 1 mass % or more and 15 mass % or less, and more preferably 1.5 mass % or more and 10 mass % or less.

The positive electrode 50 can be produced according to a known method. For example, the positive electrode 50 can be produced by preparing a positive electrode paste containing components constituting the positive electrode active material layer 54 and a solvent (for example, N-methylpyrrolidone), applying the positive electrode paste to the positive electrode current collector 52, and drying it. The positive electrode active material layer 54 formed by drying may be additionally subjected to press processing.

As shown in FIG. 1 and FIG. 2, the negative electrode 60 has typically a sheet form, and includes a negative electrode current collector 62 and a negative electrode active material layer 64 provided on one surface or both surfaces of the negative electrode current collector 62. In the shown example, the negative electrode 60 includes a negative electrode active material layer non-forming part 62a in which the negative electrode current collector 62 is exposed at an end thereof. The negative electrode active material layer non-forming part 62a functions as a current collecting part, the configuration of the current collecting part is not limited thereto.

Regarding the negative electrode current collector 62, a copper foil or the like can be used.

The negative electrode 60 contains, particularly, in the negative electrode active material layer 64, a negative electrode material containing graphite having open pores and $SiO_2$ disposed in the open pores.

Graphite having open pores is a negative electrode active material. Here, the open pores are pores that are connected to outside air. The graphite may be natural graphite or a modified product thereof or may be artificial graphite.

The primary particle size of $SiO_2$ is generally smaller than the opening diameter of the open pores. The opening diameter of the open pores and the primary particle size of $SiO_2$ can be measured using an electron microscope.

In the negative electrode material, a mass ratio of $SiO_2$ to graphite is not particularly limited. In the negative electrode material, when the amount of $SiO_2$ is too small, a resistance reduction effect becomes weak, and in order to obtain a strong resistance reduction effect, a time required for an aging process becomes very long, and there is a risk of production efficiency decreasing. Therefore, in order to obtain a stronger resistance reduction effect, the mass ratio of Sift to graphite is preferably 0.5 mass % or more and more preferably 1.5 mass % or more. In addition, when the amount of $SiO_2$ is too large, this may cause aggregation of SiO$_2$ and there is a risk of an effect of lowering resistance being weakened. Therefore, in order to obtain a stronger resistance reduction effect, the mass ratio of SiO$_2$ to graphite is preferably 10 mass % or less, and more preferably 5 mass % or less.

In the negative electrode material, the porosity of graphite is not particularly limited. In the negative electrode material, when the porosity is too small, the amount of SiO$_2$ that can be retained is small, and as a result, there is a risk of a resistance reduction effect being weakened. Therefore, in order to obtain a stronger resistance reduction effect, the porosity of graphite is preferably 5% or more and more preferably 12.5% or more. When the porosity of graphite is too large, there is a risk of the strength of graphite decreasing. When the strength of graphite is too low, the graphite may be damaged (particularly, the open pores may be blocked) when the negative electrode active material layer 64 is subjected to press processing. Therefore, the porosity of graphite is preferably 25% or less and more preferably 20% or less.

Here, the porosity of graphite can be determined, for example, by measuring an apparent density using a mercury intrusion porosimeter and measuring a true density with a helium pycnometer and calculating "porosity(%)=(1−apparent density/true density)×100."

Since the negative electrode material includes a negative electrode material containing graphite having open pores and SiO$_2$ disposed in the open pores, it has generally a particle form.

The negative electrode material can be produced, for example, as follows.

(1) Graphite having open pores and SiO$_2$ having a primary particle size (typically less than 100 nm) smaller than the opening diameter of the open pores is prepared. These are stirred and mixed at a predetermined mass ratio in a dispersion medium (for example, alcohols such as ethanol) to prepare a dispersion solution. While stirring using an evaporator or the like, the dispersion medium is removed from the dispersion solution under a reduced pressure. The residual dispersion medium is removed from the obtained mixture by performing drying such as heating.

(2) Graphite having open pores and SiO$_2$, having a primary particle size (typically less than 100 nm) smaller than the opening diameter of the open pores are prepared. These are stirred and mixed at a predetermined mass ratio in a dispersion medium (for example, alcohols such as ethanol) to prepare a dispersion solution. The dispersion solution is put into an autoclave, and heated, for example, at a temperature of 80° C. to 120° C. (particularly about 100° C.) and for example, for 2 hours to 12 hours (particularly about 6 hours). After cooling, solid components are filtered off and the filtrate is washed and dried.

The content of the negative electrode material in the negative electrode active material layer 64 is not particularly limited, and is preferably 90 mass % or more and more preferably 94 mass % or more.

The negative electrode active material layer 64 may include components other than the negative electrode material, for example, a binder and a thickener.

Regarding the binder, for example styrene butadiene rubber (SBR) can be used. Regarding the thickener, for example, carboxymethyl cellulose (CMC) can be used.

The content of the binder in the negative electrode active material layer 64 is not particularly limited, and is preferably 0.1 mass % or more and 8 mass % or less and more preferably 0.5 mass % or more and 3 mass % or less.

The content of the thickener in the negative electrode active material layer 64 is not particularly limited, and is preferably 0.3 mass % or more and 3 mass % or less and more preferably 0.5 mass % or more and 2 mass % or less.

The negative electrode 60 can be produced according to a known method. For example, the negative electrode 60 can be produced by preparing a negative electrode paste containing components constituting the negative electrode active material layer 64 and a solvent (for example, water), applying the negative electrode paste to the negative electrode current collector 62, and drying it. The negative electrode active material layer 64 formed by drying may be additionally subjected to press processing.

In addition, the electrode body 20 includes generally a separator 70 that insulates the positive electrode 50 and the negative electrode 60 from each other. Regarding the separator 70, for example, a porous sheet (film) made of a resin such as polyethylene (PE), polypropylene (PP), polyester, cellulose, or polyamide may be exemplified. Such a porous sheet may have a single-layer structure or a structure in which two or more layers are laminated (for example, a three-layer structure in which a PP layer is laminated on both surfaces of a PE layer). A heat resistant layer (HRL) may be provided on the surface of the separator 70.

The separator 70 can be produced according to a known method.

In the process (A), the electrode body 20 is produced using the positive electrode 50, the negative electrode 60, and the separator 70 described above. In the present embodiment, the electrode body 20 is a wound electrode body. The electrode body 20 can be produced according to a known method. Specifically, for example, the positive electrode 50 and the negative electrode 60 are superimposed with two separators 70 therebetween to produce a laminate, and the laminate is wound in a longitudinal direction. In this case, the positive electrode active material layer non-forming part 52a and the negative electrode active material layer non-forming part 62a are wound so that they protrude outward from both ends of the electrode body 20 in a winding axis direction. In this manner, the electrode body 20 can be produced. Here, in order to obtain a flat wound electrode body shown in FIG. 1, the laminate may be wound in a flat shape, or a cylindrical wound body of the laminate is produced first and this may be pressed in a side surface direction and squeezed.

Process (B): Battery Assembly Production Process

In the process (B), a battery assembly 90 including the electrode body 20 prepared above and a non-aqueous electrolytic solution 80 containing LiPF$_6$ with a concentration of 1 mol/L or more is produced.

The non-aqueous electrolytic solution 80 typically contains a non-aqueous solvent and LiPF$_6$ which is a supporting salt (electrolyte salt) with a concentration of 1 mol/L or more.

The upper limit of the concentration of LiPF$_6$ in the non-aqueous electrolytic solution 80 is, for example, 2.0 mol/L or less. In order to obtain a particularly strong battery resistance reduction effect, the concentration of LiPF$_6$ is preferably 1.3 mol/L or more and 1.7 mol/L or less.

Regarding the non-aqueous solvent, organic solvents such as various carbonates, ethers, esters, nitriles, sulfones, and lactones which are generally used in the electrolytic solution of a lithium ion secondary battery can be used without particular limitation. Among these, preferable examples of carbonates include ethylene carbonate (EC), propylene carbonate (PC), diethyl carbonate (DEC), dimethyl carbonate (DMC), ethyl methyl carbonate (EMC), monofluoro ethylene carbonate (MFEC), difluoroethylene carbonate (DFEC), monofluoromethyl difluoromethyl carbonate (F-DMC), and trifluorodimethyl carbonate (TFDMC). Such non-aqueous solvents may be used alone or two or more thereof may be appropriately used in combination.

The non-aqueous electrolytic solution 80 may contain lithium difluorophosphate ($LiPO_2F_2$). In this case, the concentration of lithium difluorophosphate in the non-aqueous electrolytic solution 80 is, for example, 0.005 mol/L or more and 0.1 mol/L or less, and preferably 0.03 mol/L or more and 0.07 mol/L or less.

The non-aqueous electrolytic solution 80 may contain components other than the above components, for example, various additives: a gas generating agent such as biphenyl (BP) and cyclohexylbenzene (CHB); a coating forming agent; and a thickener, as long as the effects of the present disclosure are not significantly impaired.

In order to produce the battery assembly 90, a battery case 30 is prepared. As shown in FIG. 2, the battery case 30 includes a case body having an opening and a lid that blocks the opening. A thin safety valve 36 that is set to release an internal pressure when the internal pressure of the battery case 30 increases to a predetermined level or higher is provided in the lid of the battery case 30. In addition, an inlet (not shown) through which the non-aqueous electrolytic solution 80 is injected is provided in the lid of the battery case 30. Examples of materials of the battery case 30 include aluminum and an aluminum alloy.

Next, the electrode body 20 is accommodated in the battery case 30 according to a known method. As shown in FIG. 2, a positive electrode terminal 42 and a positive electrode current collecting plate 42a, and a negative electrode terminal 44 and a negative electrode current collecting plate 44a are attached to the lid of the battery case 30. The positive electrode current collecting plate 42a and the negative electrode current collecting plate 44a are welded to the positive electrode current collector 52 and the negative electrode current collector 62 (that is, the positive electrode active material layer non-forming part 52a and the negative electrode active material layer non-forming part 62a) exposed at the end of the electrode body 20. Then, the electrode body 20 is accommodated inside a main body of the battery case 30 through the opening, and the case body of the battery case 30 and the lid are welded.

Here, the form of the battery case 30 is not limited to the above form. For example, regarding the battery case 30, a battery case made of a laminate film (so called a laminate case) may be used.

Then, the electrolytic solution 80 is injected from the inlet at the lid of the battery case 30. After the electrolytic solution 80 is injected, the inlet is sealed, and thereby the battery assembly 90 can be obtained.

Here, in FIG. 2, an exact amount of the non-aqueous electrolytic solution 80 is not shown.

Here, "battery assembly" in this specification refers to an assembly of battery components required for an initial charging process and an aging process to be described below. Therefore, for example, the lid of the battery case 30 or the inlet which is included in the lid for a non-aqueous electrolytic solution may be used before sealing or after sealing.

Process (C): Initial Charging Process

Initial charging can be performed according to a known method. Specifically, for example, an external power supply is connected between the positive electrode terminal 42 and the negative electrode terminal 44 of the battery assembly produced above, and charging is performed at room temperature (generally, 25° C.±5° C.) until a voltage between the positive electrode terminal 42 and the negative electrode terminal 44 reaches a predetermined value. This charging may be constant current charging (CC charging) or constant current and constant voltage charging (CC-CV charging). For example, this charging can be performed according to constant current and constant voltage charging (CC-CV charging) in which charging is performed with a constant current of about 0.1 C to 10 C until a voltage between terminals reaches a predetermined value from when charging starts, and charging is then performed with a constant voltage until a state of charge (SOC) reaches about 60% to 100% (preferably about 80% to 100%).

Process (D): Aging Process

In the process (D), the battery assembly is left in an environment of a temperature of 50° C. or higher. When the process (D) is performed using the negative electrode material containing $SiO_2$ in the open pores, and $LiPF_6$ with a specific concentration as an electrolyte salt, it is possible to obtain a lithium ion secondary battery 100 having low resistance. Specifically, in the process (D), $LiPF_6$ in the non-aqueous electrolytic solution 80 reacts with $SiO_2$ in the negative electrode material, and lithium difluorophosphate ($LiPO_2F_2$) with a high concentration is generated on the surface of graphite. The generated $LiPO_2F_2$ forms a coating having low resistance on the surface of graphite as a negative electrode active material. That is, in the related art, when $LiPO_2F_2$ with a high concentration is contained in the non-aqueous electrolytic solution in order to reduce the resistance, the lithium ion conductivity of the non-aqueous electrolytic solution decreases and the resistance actually becomes higher. On the other hand, according to the production method of the present embodiment, since $LiPO_2F_2$ with a high concentration is locally generated on the surface of graphite on which the coating is formed, and the coating having low resistance can be formed on the surface of graphite, it is possible to form a coating derived from $LiPO_2F_2$ and having low resistance without decreasing the lithium ion conductivity.

The process (D) can be performed according to a known method. For example, the process (D) can be performed by a method in which the initially charged battery assembly 90 is left in a constant temperature chamber of which the temperature is set to 50° C. or higher.

The aging temperature is, for example, 50° C.' or higher and 80° C. or lower, and typically 50° C. or higher and 75° C. or lower.

The aging time may be appropriately determined according to the temperature, the amount of $SiO_2$ contained in the negative electrode material, the concentration of $LiPF_6$, and the like. The aging time is, for example, 12 hours or longer, and preferably 20 hours or longer. In addition, the aging time is, for example, 240 hours or shorter, preferably 120 hours or shorter, and more preferably 72 hours or shorter.

In the process (D), the SOC of the battery assembly is preferably 60% or more and 100% or less and more preferably 80% or more and 100% or less.

The lithium ion secondary battery 100 obtained as described above has an advantage of low resistance. In addition, it also has excellent storage characteristics and cycle characteristics. The obtained lithium ion secondary battery 100 can be used for various applications. Examples of suitable applications include power supplies for driving mounted in vehicles such as an electric vehicle (EV), a hybrid vehicle (HV), and a plug-in hybrid vehicle (PHV).

The lithium ion secondary battery 100 can also be used typically in the form of an assembled battery in which a plurality of batteries are connected in series and/or in parallel.

Here, the method of producing a rectangular lithium ion secondary battery including a flat wound electrode body has been described as an example. However, the battery produced according to the production method of the present embodiment is not limited thereto, and may be a lithium ion secondary battery including a laminated electrode body, a coin type lithium ion secondary battery, a cylindrical lithium ion secondary battery, a laminate lithium ion secondary battery, or the like.

While examples of the present disclosure will be described below, the present disclosure is not intended to be limited to those described in these examples.

Preparation of Negative Electrode Material 50 g of graphite having a particle size (D50) of 10 μm and a porosity shown in Table 1 and $SiO_2$ having a particle size (D50) of 80 nm were sufficiently stirred and mixed in 100 mL of ethanol to obtain a dispersion solution. A mass ratio of $SiO_2$ to graphite was a value shown in Table 1. Ethanol was removed using an evaporator from the dispersion solution while stirring under a reduced pressure. The obtained solid component was dried at 100° C. for 12 hours, and the residual ethanol was removed.

In this manner, negative electrode materials of test examples were obtained.

Production of Battery Assembly $LiNi_{1/3}Co_{1/3}Mn_{1/3}O_2$ (LNCM) as a positive electrode active material, acetylene black (AB) as a conductive material, and polyvinylidene fluoride (PVdF) as a binder at a mass ratio of LNCM:AB:PVdF=92:5:3 were mixed with N-methylpyrrolidone (NMP) to prepare a slurry for forming a positive electrode active material layer. This slurry was applied to both surfaces of an elongated aluminum foil with a thickness of 15 in a width of 100 mm, and dried, and then roll-pressed to have a predetermined thickness, and thereby a positive electrode sheet was produced.

A negative electrode material, styrene butadiene rubber (SBR) as a binder, and carboxymethyl cellulose (CMC) as a thickener at a mass ratio of C:SBR:CMC=98:1:1 were mixed with deionized water to prepare a slurry for forming a negative electrode active material layer. This slurry was applied in a belt shape to both surfaces of an elongated copper foil having a thickness of 10 μm, dried, and then roll-pressed, and thereby a negative electrode sheet was produced.

In addition, a separator sheet in which a ceramic layer (heat resistant layer) having a thickness of 4 μm was formed on the surface of a porous polyolefin sheet having a three-layer structure of PP/PE/PP and having a thickness of 24 μm was prepared.

The produced positive electrode sheet and negative electrode sheet were made to face each other with the separator sheet therebetween to produce an electrode body. Here, the heat resistant layer of the separator sheet was made to face the negative electrode.

An electrolyte salt shown in Table 1 and with a concentration shown in Table 1, and $LiPO_2F_2$ with a concentration of 0.05 mol/L were dissolved in a mixed solvent containing ethylene carbonate (EC), dimethyl carbonate (DMC), and ethyl methyl carbonate (EMC) at a volume ratio of EC:DMC:EMC=3:3:4, and thereby a non-aqueous electrolytic solution was prepared.

An aluminum case including a lid having a liquid injection port and a case body was prepared.

An electrode terminal and a current collecting plate were attached to the lid. Then, the produced electrode body and the current collecting plate were bonded by welding. The electrode body bonded to the lid in this manner was inserted into the case body, and the lid and the case body were welded.

A predetermined amount of the prepared non-aqueous electrolytic solution was injected from the liquid injection port, and a sealing screw was fastened to the liquid injection port and sealing was performed.

The non-aqueous electrolytic solution was left for a predetermined time so that it was impregnated into the electrode body, and thereby a battery assembly was obtained.

Initial Charging and Aging Treatment

Initial charging was performed according to a constant current-constant voltage method. The produced battery assembly was subjected to constant current charging until the voltage reached 4.1 V at a current value of ⅓ C, and constant voltage charging was then performed until the current value reached 1/50 C, and the battery was fully charged.

Then, an aging treatment was performed in a thermostatic chamber at 50° C. for 20 hours, and lithium ion secondary batteries of test examples were completed.

However, in Test Example 2, a lithium ion secondary battery was completed by performing only initial charging without performing an aging treatment.

Evaluation of Resistance

The SOC of the lithium ion secondary batteries obtained above was adjusted to 56%, and the batteries were left in an environment of a temperature of −10° C. Charging was performed at this temperature and at a predetermined current value for 30 seconds, and a voltage change amount ΔV was determined. A resistance value was calculated by dividing the voltage change amount ΔV by the current value. A ratio of the resistance value of other test examples to 100 which was the resistance value of Test Example 1 was determined. The results are shown in Table 1.

TABLE 1

| | Negative electrode material | | Electrolyte salt | | | |
|---|---|---|---|---|---|---|
| | Porosity of graphite (%) | Ratio of $SiO_2$ (mass %) | Type | Concentration (mol/L) | Aging treatment | Resistance ratio |
| Test Example 1 | 15 | 0 | $LiPF_6$ | 1.5 | Yes | 100 |
| Test Example 2 | 15 | 3 | $LiPF_6$ | 1.5 | No | 102 |

TABLE 1-continued

| | Negative electrode material | | Electrolyte salt | | | |
|---|---|---|---|---|---|---|
| | Porosity of graphite (%) | Ratio of $SiO_2$ (mass %) | Type | Concentration (mol/L) | Aging treatment | Resistance ratio |
| Test Example 3 | 15 | 3 | $LiBF_4$ | 1.5 | Yes | 108 |
| Test Example 4 | 15 | 3 | $LiPF_6$ | 1.5 | Yes | 94 |
| Test Example 5 | 15 | 3 | $LiPF_6$ | 0.9 | Yes | 103 |
| Test Example 6 | 15 | 3 | $LiPF_6$ | 1 | Yes | 95 |
| Test Example 7 | 15 | 0.5 | $LiPF_6$ | 1.5 | Yes | 97 |
| Test Example 8 | 15 | 10 | $LiPF_6$ | 1.5 | Yes | 97 |
| Test Example 9 | 0 | 3 | $LiPF_6$ | 1.5 | Yes | 99 |
| Test Example 10 | 5 | 3 | $LiPF_6$ | 1.5 | Yes | 96 |
| Test Example 11 | 10 | 3 | $LiPF_6$ | 1.5 | Yes | 97 |
| Test Example 12 | 25 | 3 | $LiPF_6$ | 1.5 | Yes | 96 |

Test Examples 4, 6 to 8, and 10 to 12 were test examples within the range of the production method according to the present embodiment described above.

Based on the results of Test Examples 1 to 6 and 9, it can be understood that, when graphite had open pores, the graphite contained $SiO_2$ in the open pores, the electrolyte salt was $LiPF_6$, the concentration thereof was 1 mol/L or more, and an aging process was performed, it was possible to reduce the resistance of the lithium ion secondary battery.

In addition, based on the results of Test Examples 4, 7, and 8, it can be understood that, even if the ratio of the $SiO_2$ content to graphite changed, a resistance reduction effect was obtained.

Based on the results of Test Examples 4 and 10 to 12, it can be understood that, even if the porosity of graphite changed, a resistance reduction effect was obtained.

In addition, the same experiment was performed using $Li_4Ti_5O_{12}$ or SiO in place of graphite as a negative electrode active material, but the battery resistance was higher than in Test Example 1. This is thought to be caused by the fact that, when $Li_4Ti_5O_{12}$ was used, the potential was not suitable for forming a coating derived from $LiPO_2F_2$. In addition, it is also thought to be caused by the fact that, when SiO was used, an amount of expansion and contraction of SiO due to charging and discharging increased, and thereby a coating derived from $LiPO_2F_2$ deteriorated.

As described above, according to the method of producing a lithium ion secondary battery disclosed here, it is possible to produce a lithium ion secondary battery having low resistance.

While specific examples of the present disclosure have been described above in detail, these are only examples, and do not limit the scope of the claims. The technology described in the scope of the claims includes various modifications and alternations of the specific examples exemplified above.

What is claimed is:

1. A method of producing a lithium ion secondary battery, comprising:
   preparing an electrode body which includes a positive electrode and a negative electrode and in which the negative electrode contains a negative electrode material containing a porous graphite particle having open pores and $SiO_2$ disposed in the open pores;
   producing a battery assembly including the electrode body and a non-aqueous electrolytic solution containing $LiPF_6$ with a concentration of 1 mol/L or more; and
   generating lithium difluorophosphate in the electrode body.

2. The method according to claim 1, wherein the porous graphite particle includes a graphite, and a porosity of the graphite is 5% or more and 25% or less.

3. The method according to claim 1, wherein the porous graphite particle includes a graphite, and a mass ratio of $SiO_2$ to the graphite is 0.5 mass % or more and 10 mass % or less.

4. A lithium ion secondary battery, comprising:
   an electrode body which includes a positive electrode and a negative electrode, in which the negative electrode contains a negative electrode material containing a porous graphite particle having open pores and $SiO_2$ disposed in the open pores; and
   $LiPF_6$.

5. The lithium ion secondary battery according to claim 4, wherein the porous graphite particle includes a graphite, and a porosity of the graphite is 5% or more and 25% or less.

6. The lithium ion secondary battery according to claim 4, wherein the porous graphite particle includes a graphite and, a mass ratio of $SiO_2$ to the graphite is 0.5 mass % or more and 10 mass % or less.

7. The method according to claim 1, wherein the $SiO_2$ is in particle form and a primary particle size of the $SiO_2$ is smaller than an opening diameter of the open pores.

8. The method according to claim 7, wherein the primary particle size of the $SiO_2$ is less than 100 nm.

9. The lithium ion secondary battery according to claim 4, wherein the $SiO_2$ is in particle form and a primary particle size of the $SiO_2$ is smaller than an opening diameter of the open pores.

10. The lithium ion secondary battery according to claim 9, wherein the primary particle size of the $SiO_2$ is less than 100 nm.

11. The method according to claim 1, wherein the porous graphite particle includes a graphite, and a coating containing the lithium difluorophosphate is formed on a surface of the graphite such that the lithium difluorophosphate is generated in the electrode body.

12. The lithium ion secondary battery according to claim 4, wherein the electrode body contains lithium difluorophosphate.

13. The lithium ion secondary battery according to claim 4, wherein the negative electrode contains lithium difluorophosphate.

* * * * *